United States Patent [19]

Henne et al.

[11] 4,390,455

[45] Jun. 28, 1983

[54] CATALYTIC MEMBRANES IN ARTIFICIAL ORGANS

[75] Inventors: Werner Henne; Jürgen Scheuren, both of Wuppertal, Fed. Rep. of Germany

[73] Assignee: Akzo N.V., Arnhem, Netherlands

[21] Appl. No.: 330,772

[22] Filed: Dec. 14, 1981

[30] Foreign Application Priority Data

Dec. 22, 1980 [DE] Fed. Rep. of Germany ....... 3048542

[51] Int. Cl.$^3$ ............................................. B01J 31/06
[52] U.S. Cl. .................................... 252/430; 252/428; 252/477 R; 210/500.2; 427/343
[58] Field of Search .................... 252/428, 430, 477 R

[56] References Cited

U.S. PATENT DOCUMENTS

| | | | |
|---|---|---|---|
| 3,905,775 | 9/1975 | Sewards et al. ............ | 252/477 R X |
| 4,309,463 | 1/1982 | Lange et al. ................ | 252/477 R X |
| 4,330,436 | 5/1982 | Cairns et al. ............... | 252/477 R X |

*Primary Examiner*—Patrick Garvin
*Attorney, Agent, or Firm*—Michael J. Striker

[57] ABSTRACT

Method for the production of membranes for artificial organs, in the form of tube foils, flat foils or hollow filaments, into which metals and/or metal compounds are incorporated, in which a metal salt solution is introduced into a membrane composed of a polymer, the membrane is then attacked with gaseous precipitation agent and brought to reaction for precipitation. The improvement is having the introduction of the metal salt solution and the attack with gas take place in a membrane-containing module for an artificial organ, by leading the metal salt solution and the gaseous precipitation agent successively through a space enclosed by the membrane, provided for the flow-through of blood.

2 Claims, No Drawings

CATALYTIC MEMBRANES IN ARTIFICIAL ORGANS

BACKGROUND OF THE INVENTION

Shaped bodies of polymers, in which metals and/or metal compounds are incorporated, produced through introduction of a reactionable metal compound in the form of a solution and precipitating reaction of the metal compound with gaseous precipitation agents, with which the shaped bodies of a polymer, containing the metal compound solution, are attacked with gas, are the subject of an associated application, now Lange et al., U.S. Pat. No. 4,309,463, issued Jan. 5, 1982.

Also, a method for the production of such shaped bodies which is thereby characterized in that one introduces a metal salt solution into a shaped body of polymer, and this is attacked with gaseous precipitating agents and brought to precipitation reaction, is also the subject of the associated application. An important area of application for such shaped bodies is, however, catalytic membranes, and, in particular, special membranes which can find use in artificial organs such as artificial lungs. These membranes contain preferably manganese dioxide, colloidal silver or chelated iron, platinum, silver and gold and, in particular, ruthenium oxide and ruthenium sulfide.

It has turned out that for example, for artificial lungs, a relatively large membrane surface is necessary. In an oxygenator for adults, for example, about 3 $m^2$ of a catalytic membrane are required. Catalytic membranes, which have been produced according to the associated application, are clearly more sensitive to collapse and tensile strength than normal dialysis membranes, and for that reason are easily vulnerable. One thereby obtains, in spite of greater care in assembly of modules with catalytic membranes according to the associated application, too great a number of unusable oxygenators.

SUMMARY OF THE INVENTION

An object of the present invention is a further modification of the subject of the associated application, now U.S. Pat. No. 4,309,463, so that the difficulties occurring upon assembly of modules with catalytic membranes according to that application are diminished.

This object is attained according to the present invention by having the introduction of the metal salt solution and the gaseous attack take place in a module with dialysis membranes for artificial organs. Artificial organs, such as artificial kidneys or blood oxygenators among others, are in general so constructed that the membranes are collected in a particular housing, which is provided with inlets and outlets for the blood and the cleansing liquid, a module which, after treatment of a patient, is exchanged, whereas the customary components of artificial organs contained in the monitor, the pumps, thermostat and measuring apparatus, are collected and only need a cleaning and sterilization.

The present invention offers the advantage of initially introducing the membranes into a housing and forming the module therewith. If required, there then follows the incorporation of the metal through introduction of a metal salt solution and attack by gas in the otherwise prepared, manufactured module.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

One requires therefore no particular stock-keeping for oxygenators, since the dialysator modules for artificial kidneys found in the market today in practically any number, must be converted into oxygenator only through the supplementary introduction of a metal salt solution and gaseous attack according to the method of the associated application, whereby also with regard to the precipitating metal and/or metal compound, a greater flexibility is obtained. The greater membrane surface required with oxygenators can be obtained through parallel and/or successive provision of several dialysator modules.

It is of particular advantage when the metal salt solution and the gaseous precipitating agent are led successively through the space enclosed by the membrane, provided for the flow-through of blood. Thereby, with the conversion of a dialysator module into an oxygenator module, the membrane is checked at the same time for density and leakproofness. It is of utmost importance for the safety of the patients that, with construction of oxygenator modules working according to the principle of $H_2O_2$-decomposition, the passage through of $H_2O_2$ be avoided, since it constitutes a danger to the life of the patients. The testing of the passage through of $H_2O_2$ is for that reason, for each oxygenator module, which works according to this otherwise very elegant principle, necessary before its clinical use. With this advantageous embodiment of the method, the testing of $H_2O_2$-passage-through is connected with the introduction of the metal and/or metal compounds into the membrane. The module is then ready for application without additional testing.

It will be understood that each of the elements described above, or two or more together, may also find a useful application in other types of catalytic membranes differing from the types described above.

While the invention has been illustrated and described as embodied in catalytic membranes in artificial organs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method for the production of membranes for artificial organs in the form of tube foils, flat foils or hollow filaments into which metals and/or metal compounds are incorporated, by introducing a metal salt solution into the membrane composed of a polymer, and then attacking the membrane with gaseous precipitating agent, and bringing it to reaction for precipitation, the improvement comprising having the introduction of the metal salt solution and the attack with gas take place in a membrane-containing module for an artificial organ.

2. Method according to claim 1, wherein the metal salt solution and the gaseous precipitation agent are led successively through a space enclosed by the membrane, provided for the throughput of blood.

* * * * *